United States Patent
Versteyhe et al.

(10) Patent No.: US 8,622,860 B2
(45) Date of Patent: *Jan. 7, 2014

(54) METHOD AND APPARATUS FOR TRANSFERRING POWER BETWEEN A FLYWHEEL AND A VEHICLE

(75) Inventors: Mark R. J. Versteyhe, Oostkamp (BE); Steven J. Wesolowski, Waterville, OH (US); Donald J. Remboski, Ann Arbor, MI (US); Timothy J. Morscheck, Portage, MI (US)

(73) Assignee: Spicer Off-Highway Belgium N.V., Sint-Michiels, Bruges (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,920

(22) Filed: Jul. 31, 2012

(65) Prior Publication Data

US 2013/0192413 A1 Aug. 1, 2013

Related U.S. Application Data

(60) Provisional application No. 61/513,706, filed on Aug. 1, 2011.

(51) Int. Cl.
*F16H 3/72* (2006.01)
*F16H 33/08* (2006.01)
(52) U.S. Cl.
USPC .............................................. 475/1; 475/267
(58) Field of Classification Search
USPC ....................................................... 475/1, 267
See application file for complete search history.

(56) References Cited

U.S. PATENT DOCUMENTS

| | | | |
|---|---|---|---|
| 2,803,151 A | 8/1957 | Clerk |
| 3,164,526 A | 1/1965 | Girard |
| 3,665,788 A | 5/1972 | Nyman |
| 3,734,222 A | 5/1973 | Bardwick, III |
| 3,886,810 A | 6/1975 | Sugiyama et al. |
| 3,949,556 A | 4/1976 | Wallis |
| 4,018,052 A | 4/1977 | Laussermair |
| 4,069,669 A | 1/1978 | Pitkanen |
| 4,163,367 A | 8/1979 | Yeh |
| 4,233,858 A | 11/1980 | Rowlett |

(Continued)

FOREIGN PATENT DOCUMENTS

| | | |
|---|---|---|
| CA | 1 144-784 | 4/1983 |
| DE | 27 52 390 A1 | 7/1978 |

(Continued)

OTHER PUBLICATIONS

European Search Report for EP 12 17 8714 dated Nov. 27, 2012.

*Primary Examiner* — Edwin A Young
(74) *Attorney, Agent, or Firm* — Marshall & Melhorn, LLC

(57) ABSTRACT

A vehicle driveline and a method for transferring energy from a flywheel is provided. The vehicle driveline includes a power source, a clutch drivingly engaged with the power source, a transmission drivingly engaged with the clutch, a power transmission device drivingly engaged with one of the power source, the clutch, and the transmission, a controller in communication with the power transmission device, and a flywheel drivingly engaged with the power transmission device. The power transmission device facilitates a transfer of energy from the flywheel to one of the clutch and the transmission. The power transmission device also facilitates a transfer of energy from one of the power source, the clutch, and the transmission to the flywheel. The controller directs the transfer of energy to and from the flywheel.

20 Claims, 4 Drawing Sheets

(56) References Cited

U.S. PATENT DOCUMENTS

| | | | |
|---|---|---|---|
| 4,276,951 A | 7/1981 | Smitley | |
| 4,309,620 A | 1/1982 | Bock | |
| 4,317,435 A | 3/1982 | Kohlhage | |
| 4,321,990 A | 3/1982 | Koch, Jr. | |
| 4,329,889 A | 5/1982 | Hachiya | |
| 4,405,031 A | 9/1983 | Rotter | |
| 4,471,668 A | 9/1984 | Elsner | |
| 4,479,356 A | 10/1984 | Gill | |
| 4,495,829 A | 1/1985 | Kemper | |
| 4,495,836 A | 1/1985 | Cohen | |
| 4,520,688 A | 6/1985 | Ban | |
| 4,563,914 A | 1/1986 | Miller | |
| 4,574,926 A | 3/1986 | Bubak | |
| 4,583,505 A | 4/1986 | Frank et al. | |
| 4,588,040 A | 5/1986 | Albright, Jr. et al. | |
| 4,625,823 A | 12/1986 | Frank | |
| 4,928,553 A | 5/1990 | Wagner | |
| 5,425,682 A | 6/1995 | Hayashi | |
| 5,553,514 A | 9/1996 | Walkowe | |
| 5,755,303 A | 5/1998 | Yamamoto et al. | |
| 6,024,667 A | 2/2000 | Krohm et al. | |
| 6,098,735 A | 8/2000 | Sadarangani et al. | |
| 6,232,671 B1 | 5/2001 | Gottfried, Jr. | |
| 6,412,616 B1 | 7/2002 | Allen et al. | |
| 7,341,534 B2 | 3/2008 | Schmidt | |
| 7,475,667 B2 | 1/2009 | Al-Bannai | |
| 7,540,346 B2 | 6/2009 | Hu | |
| 7,931,107 B2 | 4/2011 | Jones, Jr. | |
| 8,006,589 B2 | 8/2011 | Muraki et al. | |
| 8,033,954 B2 | 10/2011 | Theobald et al. | |
| 8,230,961 B2 | 7/2012 | Schneidewind | |
| 2002/0002094 A1* | 1/2002 | Kmicikiewicz | 475/211 |
| 2008/0081724 A1 | 4/2008 | Ivantysynova et al. | |
| 2010/0152982 A1 | 6/2010 | Bowman et al. | |
| 2010/0152984 A1 | 6/2010 | Bowman et al. | |
| 2010/0276222 A1* | 11/2010 | Gramling et al. | 180/165 |
| 2010/0280712 A1 | 11/2010 | Bowman | |
| 2011/0256972 A1* | 10/2011 | Greenwood | 475/1 |
| 2011/0271790 A1 | 11/2011 | Van Druten et al. | |
| 2012/0080247 A1 | 4/2012 | Schmid et al. | |
| 2013/0090210 A1* | 4/2013 | Wesolowski et al. | 477/107 |

FOREIGN PATENT DOCUMENTS

| | | |
|---|---|---|
| DE | 39 12 339 A1 | 10/1990 |
| DE | 41 02 882 A1 | 6/1992 |
| DE | 41 24 479 A1 | 1/1993 |
| DE | 10 2005 059 903 A1 | 6/2007 |
| DE | 10 2007 033 577 A1 | 1/2009 |
| DE | 10 2010 029 844 A1 | 12/2011 |
| DE | 10 2010 035 441 A1 | 3/2012 |
| EP | 0 127 986 A2 | 5/1984 |
| FR | 2 884 887 A1 | 10/2006 |
| GB | 720272 | 12/1954 |
| GB | 971448 | 9/1964 |
| GB | 2 405 129 A | 2/2005 |
| GB | 2 449 282 A | 11/2008 |
| GB | 2 463 136 A | 3/2010 |
| GB | 2464257 A | 4/2010 |
| JP | 54-120197 | 9/1979 |
| JP | 57-1841 | 1/1982 |
| JP | 57-12157 | 1/1982 |
| JP | 59-222071 | 12/1984 |
| WO | WO 2004/000595 A1 | 12/2003 |
| WO | WO 2007/135428 A1 | 11/2007 |
| WO | WO 2009/138227 A2 | 11/2009 |
| WO | WO 2009/138227 A3 | 11/2009 |
| WO | WO 2011/082764 A1 | 7/2011 |
| WO | WO 2011/120492 A1 | 10/2011 |

* cited by examiner

METHOD AND APPARATUS FOR TRANSFERRING POWER BETWEEN A FLYWHEEL AND A VEHICLE

CLAIM OF PRIORITY

The present application claims priority to and incorporates by reference U.S. Provisional Application No. 61/513,706 filed Aug. 1, 2011, entitled "Method and Apparatus for Transferring Power Between a Flywheel and a Vehicle."

BACKGROUND OF THE INVENTION

There is a rising demand to increase fuel economy in a wide range of vehicles, including passenger vehicles, commercial vehicles, such as tractor trailers, and off-highway vehicles, such as mining and construction equipment. One of the ways to increase fuel economy is to reduce the size of the engine for any gasoline powered vehicle. Of course, if the engine size is reduced, available power is also reduced unless a supplemental power source for high or increased power demands can be selectively engaged.

Selective engagement opportunities might be during high power demands, such as when the vehicle is going up a grade, passing, starting or other working conditions. A supplemental power source permits an internal combustion engine to be reduced in size so that it can still handle a wide range of power needs of the vehicle, but the internal combustion engine need not be sized to meet every possible need. Instead, the supplemental power source may be used to selectively add power to the vehicle at high demand times. It may also be permissible or desirable for the supplemental power source to recover energy from the vehicle and then use that recovered energy to power the source as well as the vehicle.

One possible supplemental power source for vehicles may be such as a mechanical flywheel. Flywheel energy storage systems work by accelerating a rotor or disc to very high speeds via an external device, such as an internal combustion engine, an electromagnet, or an axle. The available kinetic energy in the system can be transferred into rotational mechanical energy, thus providing a power source to the driveline. The rotating flywheel can also be used as a power sink during braking. When energy is extracted from the flywheel, the rotational speed of the flywheel is reduced as a consequence of the principle of conservation of energy; adding energy to the flywheel correspondingly results in an increase in the speed of the flywheel.

In one example, a flywheel energy storage system can be connected to the front or rear axle of a vehicle. During periods of deceleration, braking energy is used to speed up the flywheel (up to about 60,000 revolutions per minute, for example). When the vehicle accelerates, the rotational energy from the flywheel is transferred to mechanical energy to the driving wheels of the vehicle via a specially designed device, like a continuously variable transmission, for example.

A known driveline layout for a vehicle driveline 100 equipped with a flywheel 102 is depicted in FIG. 1. As shown in the figure, a power source 104 (such as an internal combustion engine or an electric motor, for example) is connected to a clutch 106, which is connected to a transmission 108, which is connected to an axle 110 and a pair of wheels 112. The flywheel 102 is schematically depicted as being connected to an output 114 of the power source 104. The vehicle driveline 100 layout has several disadvantages that must be overcome.

A first disadvantage of the driveline layout shown in FIG. 1 is synchronizing a varying speed of the flywheel 102 with a varying speed of a vehicle (not shown) the vehicle driveline 100 is incorporated in. The varying speed of the flywheel 102 is dependent on an amount of energy stored therein. Accordingly, if a portion of the amount of energy stored in the flywheel is transferred to the vehicle driveline 100, a speed of the flywheel 102 drops. Each of the speeds in the vehicle driveline (a speed of the power source 104, a speed of an input 116 of the transmission 108, a speed of an output 118 of the transmission 108, for example) is related to a road speed of the vehicle. As a non-limiting example, the power source 104 may have a rotational speed that varies between about 1000 revolutions per minute and about 3000 revolutions per minute; resulting in a spread factor of about 3. The flywheel 102 may have a rotational speed that varies between about 30,000 revolutions per minute to about 60,000 revolutions per minute; resulting in a spread factor of about 2. The rotational speed of the power source 104 is linked to the road speed of the vehicle, and the flywheel 102 must be able to be drivingly engaged therewith. Therefore, a device capable of providing a total spread factor of about 6 (a spread factor of about 2 multiplied by a spread factor of about 3) would be required to drivingly engage the flywheel 102 with the vehicle driveline 100.

A second disadvantage is a difficulty in smoothly connecting the vehicle driveline 100 with the flywheel 102. If the flywheel 102 was infinitely rigidly connected to the driveline with an appropriate ratio, at a later point the ratio between the flywheel 102 and the road speed of the vehicle would not be valid anymore and the flywheel 102 would provide either too much torque or not enough torque. Further, pairing the vehicle driveline 100 and the flywheel 102 influences the rotational speed of the flywheel 102 and thus the amount of torque provided by the flywheel 102. Accordingly, for the vehicle driveline 100 to be capable of engaging the flywheel 102, the vehicle driveline 100 must permit small errors in the ratio set to occur.

It would be advantageous to develop a driveline and a method for transferring energy from a flywheel, that increases a fuel efficiency of a vehicle the driveline is incorporated in, permits a primary power source to be selectively supplemented using the flywheel, and permits the flywheel to store and capture excess energy present in the driveline.

SUMMARY OF THE INVENTION

Presently provided by the invention, a driveline and a method for transferring energy from a flywheel, that increases a fuel efficiency of a vehicle the driveline is incorporated in, permits a primary power source to be selectively supplemented using the flywheel, and permits the flywheel to store and capture excess energy present in the driveline, has surprisingly been discovered.

In one embodiment, the present invention is directed to a vehicle driveline including a power source, a clutch drivingly engaged with the power source, a transmission drivingly engaged with the clutch, a power transmission device drivingly engaged with one of the power source, the clutch, and the transmission, a controller in communication with the power transmission device, and a flywheel drivingly engaged with the power transmission device. The power transmission device facilitates a transfer of energy from the flywheel to one of the clutch and the transmission. The power transmission device also facilitates a transfer of energy from one of the power source, the clutch, and the transmission to the flywheel. The controller directs the transfer of energy to and from the flywheel based on at least one of a state of charge of the flywheel, a power requirement of the vehicle driveline, and a state of operation of the power source.

In another embodiment, the present invention is directed to a vehicle driveline including a power source, a clutch drivingly engaged with the power source, a transmission drivingly engaged with the clutch, a switching clutch assembly drivingly engaged with the power source including a first switching clutch, a second switching clutch, and a switching clutch assembly output, a controller in communication with the first switching clutch and the second switching clutch, the first switching clutch may be engaged to drivingly engage the flywheel with the switching clutch assembly output and the second switching clutch may be engaged to drivingly engage the power source with the switching clutch assembly output, and a flywheel drivingly engaged with the first switching clutch. The power transmission device facilitates a transfer of energy from the flywheel to one of the clutch and the transmission. The power transmission device also facilitates a transfer of energy from one of the power source, the clutch, and the transmission to the flywheel. The controller directs the transfer of energy to and from the flywheel based on at least one of a state of charge of the flywheel, a power requirement of the vehicle driveline, and a state of operation of the power source.

The present invention also is directed to a method of transferring energy from a flywheel. The method comprises the steps of providing a power source, providing a clutch drivingly engaged with the power source, providing a transmission drivingly engaged with the clutch, providing a power transmission device drivingly engaged with one of the power source, the clutch, and the transmission, the power transmission device facilitating a transfer of energy from the flywheel to one of the clutch and the transmission, providing a controller in communication with the power transmission device, providing a flywheel drivingly engaged with the power transmission device, sensing one of a state of charge of the flywheel, a power requirement of the vehicle driveline, and a state of operation of the power source, and directing a transfer of energy to and from the flywheel based on at least one of the state of charge of the flywheel, the power requirement of the vehicle driveline, and the state of operation of the power source using the controller.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless expressly stated otherwise.

Figure 1:
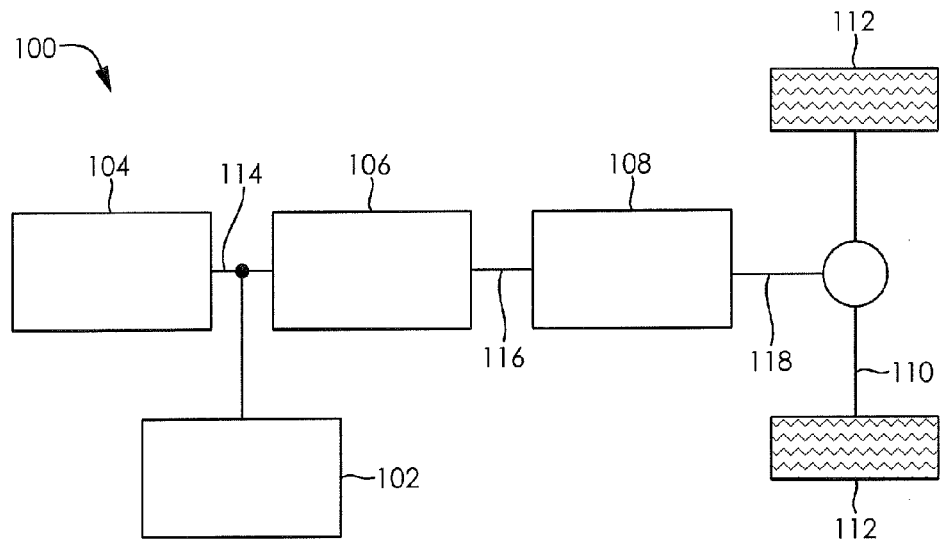
FIG. 1 is a schematic sketch of a vehicle driveline equipped with a flywheel system according to the prior art.
Figure 2:
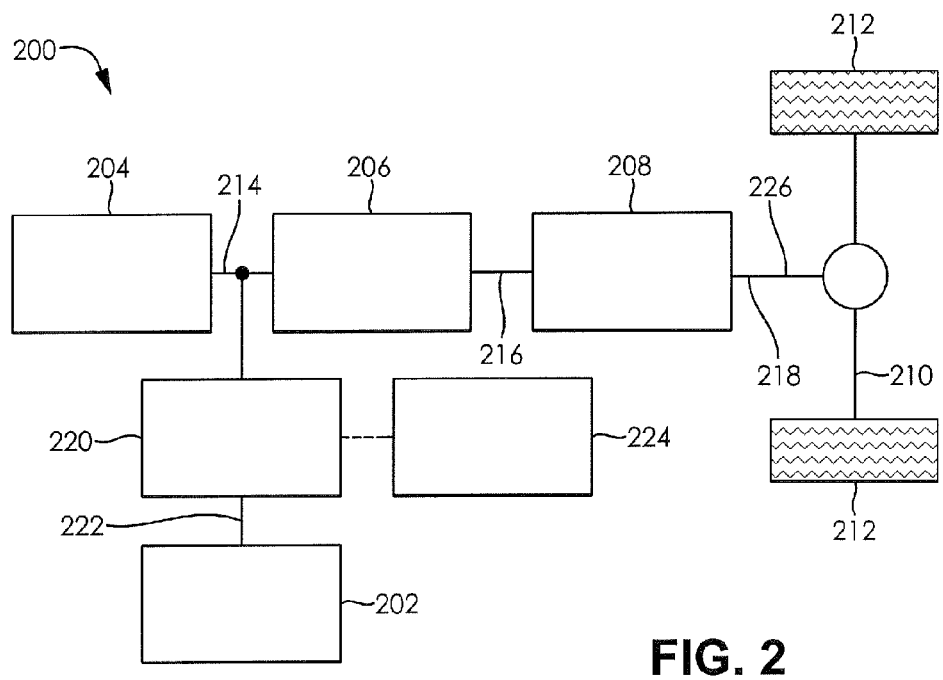
FIG. 2 is a schematic sketch of a vehicle driveline equipped with a flywheel system according to an embodiment of the invention.

FIG. 2 illustrates a vehicle driveline 200 according to an embodiment of the invention. The embodiment shown in FIG. 2 includes similar components to the vehicle driveline 100 illustrated in FIG. 1. Similar features of the embodiment shown in FIG. 2 are numbered similarly in series, with the exception of the features described below. The vehicle driveline 200 includes a power source 204 having a power source output 214. A continuously variable transmission 220 is drivingly engaged with the power source output 214. Next, a flywheel 202 is drivingly engaged with the continuously variable transmission 220. Thus, through the operation of the continuously variable transmission 220 a rotational speed of the flywheel 202 can be synchronized with a rotational speed of the power source output 214.

More particularly, by varying a ratio of the continuously variable transmission 220, synchronization is achieved between the flywheel 202 and the power source 204. In one exemplary, non-limiting example, the continuously variable transmission 220 is a pulley-belt style continuously variable transmission. The pulley-belt style continuously variable transmission comprises of a pair of variable-diameter pulleys, each shaped like a pair of opposing cones, with a belt running between them. The pulley-belt style continuously variable transmission is conventional and well known in the art.

A first pulley (not shown) is then connected to the power source output 214 and a second pulley (not shown) is connected to a flywheel shaft 222. The halves of each pulley are moveable, and as the halves of each of the pulleys are moved towards one another the belt is forced to ride higher on the pulley, effectively making a diameter of the pulley larger. Changing the diameter of the each of the pulleys varies the ratio between the power source output 214 and the flywheel shaft 222. Making the first pulley diameter smaller and the second pulley diameter larger gives a low ratio (a large number of revolutions of the power source 204 produce a small number of output revolutions of the flywheel shaft 222). As the rotational speed of the flywheel 202 increases (by capturing a kinetic energy of the vehicle driveline 200), a controller 224 of the continuously variable transmission 220 varies the diameters of the first pulley and the second pulley so that the rotational speed of the power source 204 can remain substantially constant while the rotational speed of the flywheel 202 varies. The diameters of the first pulley and the second pulley are changed by altering the applied forces on the moveable halves of each pulley. The flexibility of the continuously variable transmission 220 allows the power source 204 to maintain the rotational speed appropriate for the vehicle driveline 200 over a wide range of rotational speeds of the flywheel 202.

It is also understood that the continuously variable transmission 220 and the flywheel 202 may be drivingly engaged with another portion to the vehicle driveline 200. As non-limiting examples, the continuously variable transmission 220 may be drivingly engaged with the transmission output 218, a drive shaft 226, or an axle 210 of the vehicle driveline 200. When the continuously variable transmission 220 and the flywheel 202 are drivingly engaged with one of the transmission output 218, the drive shaft 226, and the axle 210, power losses that may occur between the power source 204 and the axle 210 may be reduced.

Figure 3:
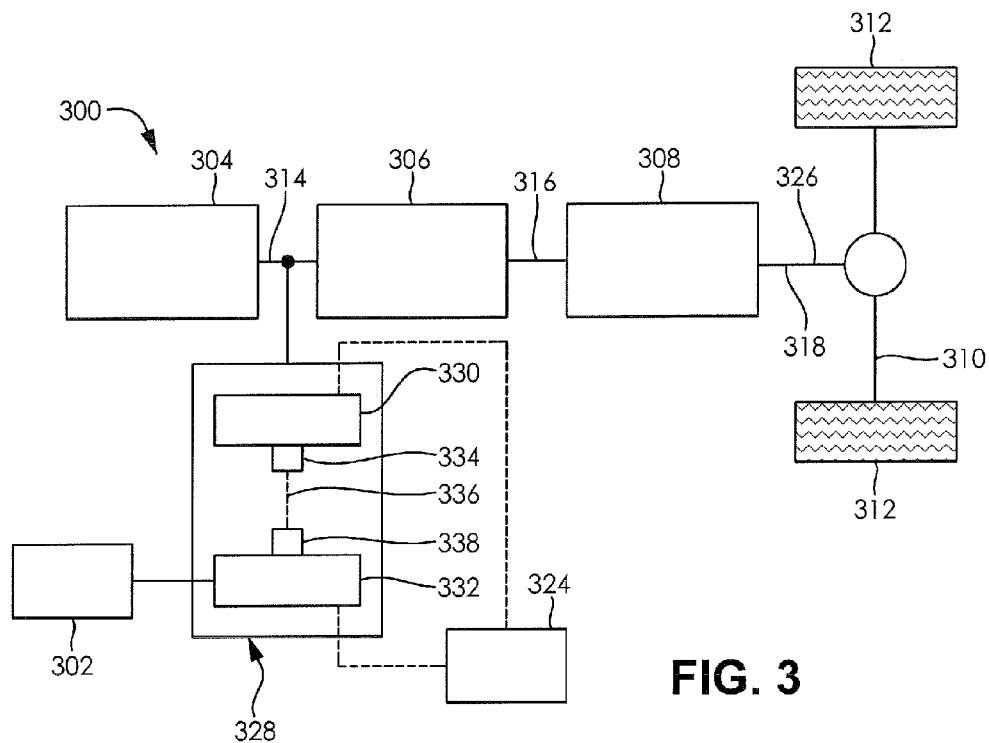
FIG. 3 is a schematic sketch of a vehicle driveline equipped with a flywheel system according to another embodiment of the invention.

FIG. 3 illustrates a vehicle driveline 300 according to another embodiment of the invention. The embodiment shown in FIG. 3 includes similar components to the vehicle driveline 100 illustrated in FIG. 1. Similar features of the embodiment shown in FIG. 3 are numbered similarly in series, with the exception of the features described below. The vehicle driveline 300 includes a power source 304 having a power source output 314, and a series electric transmission 328. The series electric transmission 328 connects the power source output 314 to a flywheel 302. The series electric transmission 328 comprises a first electrical device 330 and a second electrical device 332. The series electric transmission 328 permits power to be transferred to and from the flywheel 302 to the first electrical device 330 at any rotational speed the vehicle driveline 300 may be operating at. The first electrical device 330 and the second electrical device 332 are electric generators which may also be operated as electric motors, and may operate on direct current or alternating current.

The first electrical device 330 is drivingly engaged with the power source output 314 or other portion of the vehicle driveline 300. The first electrical device 330 includes a first inverter 334 and is in electrical communication with an electrical bus 336 and a controller 324. The first inverter 334 can vary a voltage applied to or supplied by the first electrical device 330 to adapt a torque ratio and a speed ratio between the flywheel 302 and the vehicle driveline 300.

The second electrical device 332 is drivingly engaged with the flywheel 302. The second electrical device 332 includes a second inverter 338 and is in electrical communication with the electrical bus 336 and the controller 324. The second inverter 338 can vary a voltage applied to or supplied by the second electrical device 332 to adapt a torque ratio and a speed ratio between the flywheel 302 and the vehicle driveline 300. It is understood that the inverters 334, 338 are configured to permit electrical power to be transferred to or from the first electrical device 330 to the second electrical device 332.

The flywheel 302 permits energy to be captured from or supplied to the vehicle driveline 300 during typical operation of the vehicle or to supplement the power source 304 when operation of the vehicle requires a greater amount of power than the power source 304 is capable of supplying. Further, it is understood that the flywheel 302 permits energy to be supplied to the vehicle driveline 300 in amounts the power source 304 may not be capable of supplying. As a non-limiting example, the flywheel 302 may capture or supply between about 10% and about 30% of the power requirements of the vehicle the vehicle driveline 300 and flywheel 302 are incorporated in.

It is also understood that the series electric transmission 328 and the flywheel 302 may be drivingly engaged with another portion to the vehicle driveline 300. As non-limiting examples, the series electric transmission 328 may be drivingly engaged with the transmission output 318, a drive shaft 326, or an axle 310 of the vehicle driveline 300. When the series electric transmission 328 and the flywheel 302 are drivingly engaged with one of the transmission output 318, the drive shaft 326, and the axle 310, power losses that may occur between the power source 304 and the axle 310 may be reduced.

Figure 4:
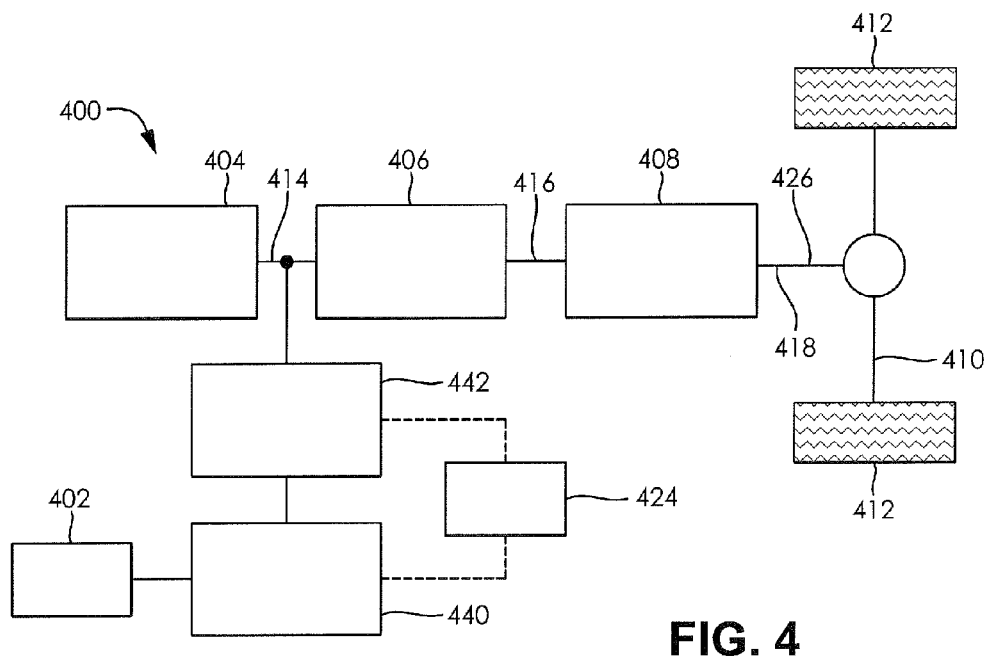
FIG. 4 is a schematic sketch of a vehicle driveline equipped with a flywheel system according to another embodiment of the invention.

FIG. 4 illustrates a vehicle driveline 400 according to another embodiment of the invention. The embodiment shown in FIG. 4 includes similar components to the vehicle driveline 100 illustrated in FIG. 1. Similar features of the embodiment shown in FIG. 4 are numbered similarly in series, with the exception of the features described below. The vehicle driveline 400 includes a power source 404 having a power source output 414, a flywheel transmission 440, and a flywheel clutch 442. The flywheel clutch 442 connects the power source output 414 and the flywheel transmission 440. It is understood that a second flywheel clutch (not shown) may be drivingly engaged with the flywheel 402 and the flywheel transmission 440 to militate against energy loss that may occur in the flywheel transmission 440 when the flywheel clutch 442 is disengaged from the vehicle driveline 400.

The flywheel transmission 440 is a fixed step transmission. Fixed step transmissions are commonly known in the art. The flywheel transmission 440 includes a plurality of gear ratios capable of providing a total spread ratio capable of engaging the power source output 414 with the flywheel 402 through the flywheel clutch 442. As a number of gear ratios included with the flywheel transmission 440 increases, losses that occur by joining the power source output 414 with the flywheel 402 through the flywheel clutch 442 decrease. The flywheel transmission 440 may be combined with the transmission 408 to reduce a cost of the vehicle driveline 400; the flywheel transmission 440 and the transmission 408 may share a housing, lubrication systems, gearing, or other transmission components.

The flywheel 402 permits energy to be captured from or supplied to the vehicle driveline 400 during typical operation of the vehicle or to supplement the power source 404 when operation of the vehicle requires a greater amount of power than the power source 404 is capable of supplying.

When energy is captured from the vehicle driveline 400 during typical operation of the vehicle, a rotational speed of the flywheel 402 is increased when a rotational speed of the power source 404 is increased. A controller 424 disengages the flywheel clutch 442 from the vehicle driveline 400, selects a gear ratio of the flywheel transmission 440 that most closely matches a rotational speed difference between the flywheel 402 and the power source 404, and then engages the flywheel clutch 442 with the vehicle driveline 400 to capture energy from the vehicle driveline 400 when the rotational speed of the power source 404 is increased. It is understood that the controller may operate the flywheel clutch 442 and the flywheel transmission 440 to capture energy from the vehicle driveline 400 during a braking process of the vehicle the vehicle driveline 400 is incorporated in.

When energy is supplied to the vehicle driveline 400 from the flywheel 402, such as when operation of the vehicle requires a greater amount of power than the power source 404 is capable of supplying, the flywheel clutch 442 is partially engaged to transfer torque from the flywheel 402 to the vehicle driveline 400. The flywheel clutch 442 is a plate style clutch; however, it is understood that the flywheel clutch 442 may be any other type of clutch that can be variably engaged.

The controller 424 selects a gear ratio that most closely matches a rotational speed difference between the flywheel 402 and the power source 404 and partially engages the flywheel clutch 442 to transfer torque from the flywheel 402 to the vehicle driveline 400.

It is also understood that the flywheel transmission 440, the flywheel clutch 442, and the flywheel 402 may be drivingly engaged with another portion to the vehicle driveline 400. As non-limiting examples, the flywheel transmission 440, the flywheel clutch 442, and the flywheel 402 may be drivingly engaged with the transmission output 418, a drive shaft 426, or an axle 410 of the vehicle driveline 400. When the flywheel transmission 440, the flywheel clutch 442, and the flywheel 402 are drivingly engaged with one of the transmission output 418, the drive shaft 426, and the axle 410, power losses that may occur between the power source 404 and the axle 410 may be reduced.

Figure 5:
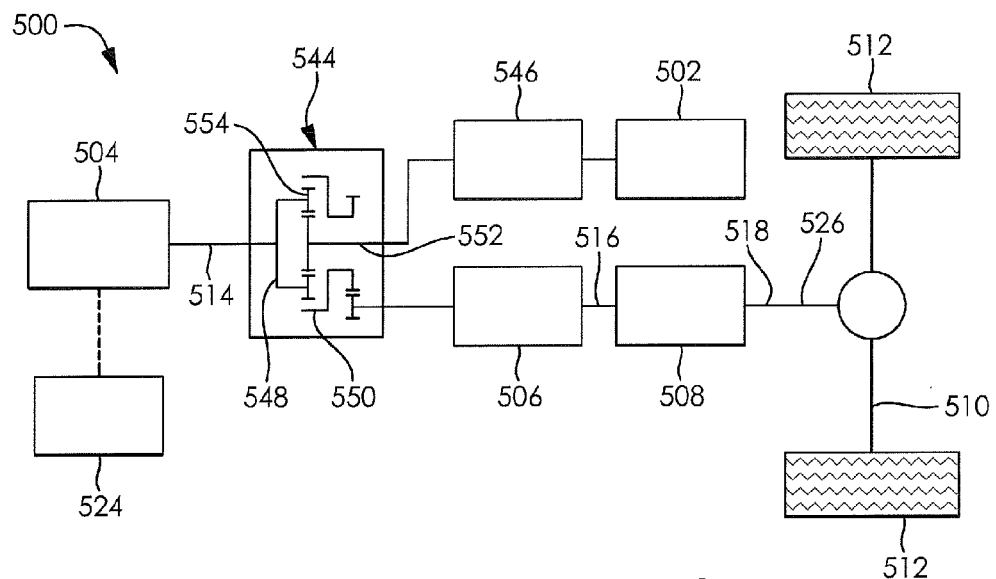
FIG. 5 is a schematic sketch of a vehicle driveline equipped with a flywheel system according to another embodiment of the invention.

FIG. 5 illustrates a vehicle driveline 500 according to another embodiment of the invention. The embodiment shown in FIG. 5 includes similar components to the vehicle driveline 100 illustrated in FIG. 1. Similar features of the embodiment shown in FIG. 5 are numbered similarly in series, with the exception of the features described below. The vehicle driveline 500 includes a power source 504 having a power source output 514, a planetary distribution gearset 544, and a torsional damper 546.

The planetary distribution gearset 544 includes a carrier assembly 548, a ring gear 550, and a sun gear 552. The carrier assembly 548 is drivingly engaged with the power source output 514 and includes a plurality of carrier pinions 554 rotatably disposed thereon; however, it is understood that gearing (not shown) disposed between the carrier assembly 548 and the power source output 514 may be used to adjust a rotational speed of the carrier assembly 548. The ring gear 550 is drivingly engaged with the transmission 508 of the vehicle driveline 500 through the clutch 506. The sun gear 552 is drivingly engaged with the torsional damper 546.

The torsional damper 546 connects the planetary distribution gearset 544 and the flywheel 502. The torsional damper 546 may comprise a pair of coaxial member having a plurality of biasing member interposed therebetween; however, it is understood that the torsional damper 546 may be any other type of torsional damper. Compression of the biasing member permits angular deviation between the coaxial members. The torsional damper 546 may be conventional torsional damper that is well known in the art; however, it is understood that the torsional damper 546 may be configured to store a greater amount of energy than a conventional torsional damper and may accommodate large angular deviations between the coaxial members. Further, it is understood that the torsional damper 546 may be a slipping clutch. The slipping clutch is conventional and well known in the art.

The vehicle driveline 500 permits a rotational speed of the power source 504 to be adjusted to permit energy to be captured from or supplied to the vehicle driveline 500 during typical operation of the vehicle or to supplement the power source 504 when operation of the vehicle requires a greater amount of power than the power source 504 is capable of supplying. The planetary distribution gearset 544 of the vehicle driveline 500 may be placed in a powered neutral position when the carrier assembly 548 (which is drivingly engaged with the power source output 514) and the sun gear 552 (which is drivingly engaged with the flywheel 502) rotate in similar directions in proportion equal to a split ratio of the planetary distribution gearset 544. Depending on an amount of energy stored in the flywheel 502 (a minimum amount is needed for the planetary distribution gearset 544 to be placed in the powered neutral position), the rotational speed of the power source 504 is adjusted by the controller 524 to place the planetary distribution gearset 544 in the powered neutral position.

With the vehicle driveline 500 drivingly engaged with the ring gear 550, the flywheel 503 has an opposite speed compared to the power source 504. The flywheel 503 is connected through the torsional damper 546 to the sun gear 552. The torsional damper 546 is used to assist in control over the power source 504, which typically cannot adjust a rotational speed immediately in response to the controller 524.

For a given speed of the vehicle driveline 500, a rotational speed of the power source 504 is set to a calculated value using the controller 524 so that a rotational speed of the vehicle driveline 500 and a rotational speed of the flywheel 503 are substantially equal. The vehicle driveline 500 may always be placed in such a condition when a rotational speed of the vehicle driveline 500 is above a certain positive value.

When a rotational speed of the power source 504 is a positive speed, and because the power source 505 provides a positive power, a torque vector of the power source 504 is positive. Since the vehicle driveline 500 absorbs power through the planetary distribution gearset 544, the torque vector acting on the planetary distribution gearset 544 is negative, hence a torque vector applied on the sun gear 552 is also negative by operational constraints of planetary gearsets. Thus, if a rotational speed of the flywheel 502 is opposite to a rotational speed of the power source 504, the flywheel 502 can deliver positive power to the vehicle driveline 500.

The vehicle driveline 500 described above requires active control using the controller 524. By delivering power to the vehicle driveline 500, the flywheel 502 will decrease in rotational speed and the vehicle increase in speed. By delivering power to the vehicle driveline 500, a speed gap between the vehicle driveline 500 and the torsional damper 546 is reduced until a torque delivered by the flywheel 502 will about equal zero. Without active control of a rotational speed of the power source 504, when a rotational speed of the power source 504 synchronizes with a rotational speed of the flywheel 502, torque stops being transferred from the flywheel 502. Accordingly, active control over a rotational speed of the power source 504 is needed to always maintain a speed gap over the torsional damper 546 so that torque may continue to be transferred from the flywheel 502.

Using similar control of the rotational speed of the power source 504, the vehicle driveline 500 permits energy to be captured from the vehicle driveline 500 and stored in the flywheel 502. Such a condition occurs when a rotational speed of the ring gear 550 is greater than the rotational speed of the carrier assembly 548, and the sun gear 552 is driven through the carrier pinions 554.

As a non-limiting example, the flywheel 502 may capture or supply between about 10% and about 30% of the power requirements of the vehicle the vehicle driveline 500 including the planetary distribution gearset 544, the torsional damper 546, and the flywheel 502 are incorporated in.

Figure 6:
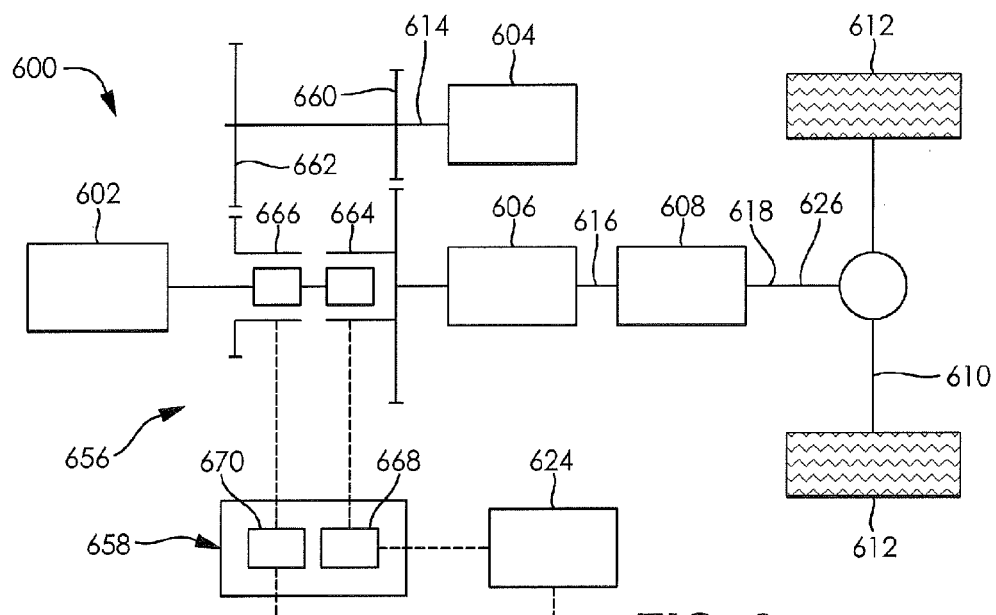
FIG. 6 is a schematic sketch of a vehicle driveline equipped with a flywheel system according to another embodiment of the invention.

FIG. 6 illustrates a vehicle driveline 600 according to another embodiment of the invention. The embodiment shown in FIG. 6 includes similar components to the vehicle driveline 100 illustrated in FIG. 1. Similar features of the embodiment shown in FIG. 6 are numbered similarly in series, with the exception of the features described below. The vehicle driveline 600 includes a power source 604 having a power source output 614, a fluid coupling assembly 656, and a pumping assembly 658.

The power source output 614 is drivingly engaged with the power source 604 and has a first gear 660 and a second gear 662 drivingly disposed thereon. A shown in FIG. 6, a diameter of the first gear 660 is different from a diameter of the second gear 662 to change a gear of the power source 604.

The first gear 660 is in driving engagement with a geared portion of a first fluid coupling 664 of the fluid coupling assembly 656. The geared portion of a first fluid coupling 664 is also in driving engagement with a clutch 606 and a transmission 608 of the vehicle driveline 600. The second gear 662 is in driving engagement with a geared portion of a second fluid coupling 666 of the fluid coupling assembly 656. A flywheel 602 is in driving engagement with a remaining portion of each of the first fluid coupling 664 and the second fluid coupling 666.

The fluid coupling assembly 656 includes the first fluid coupling 664 and the second fluid coupling 666. The fluid couplings 664, 666 are conventional and well known in the art. Further, it is understood that the fluid couplings 664, 666 may be torque converters. Each of the fluid couplings 664, 666 include two coaxial members which define a fluid cavity. When a fluid is pumped into the fluid cavity and one of the coaxial members is rotated, the rotated coaxial member drives the remaining coaxial member using the fluid, affording engagement therebetween. The fluid couplings 664, 666 also remove excess heat that may be generated by a rotational speed difference between portions of the fluid couplings 664, 666 engaged with the flywheel 602 and portions of the fluid couplings 664, 666 engaged with the power source 604 and the transmission 608.

The pumping assembly 658 includes a first pump 668 and a second pump 670. The pumps 668, 670 are fixed displacement pumps, which are conventional and well known in the art; however, it is understood that other pump types may be used. As shown in FIG. 6, the pumps 668, 670 are drivingly engaged with the vehicle driveline 600 and controlled by a controller 624. Each of the fluid couplings 664, 666 are engaged respectively when the pumps 668, 670 transfer fluid thereto.

The flywheel 602 permits energy to be captured from or supplied to the vehicle driveline 600 during typical operation of the vehicle or to supplement the power source 604 when operation of the vehicle requires a greater amount of power than the power source 604 is capable of supplying.

When energy is captured from the vehicle driveline 600 during typical operation of the vehicle, a rotational speed of the flywheel 602 is increased when the second fluid coupling 666 is engaged. The controller 624 activates the second pump 670, which engages the second fluid coupling 666, capturing energy from the power source 604. It is understood that the controller 624 may activate the first pump 668 and the second pump 670 to engage the first fluid coupling 664 and the second fluid coupling 666 to capture energy from the vehicle driveline 600 during a braking process of the vehicle the vehicle driveline 600 is incorporated in.

When energy is supplied to the vehicle driveline 600 from the flywheel 602, such as when operation of the vehicle requires a greater amount of power than the power source 604 is capable of supplying, the controller 624 activates the first pump 668 and the second pump 670 to engage the first fluid coupling 664 and the second fluid coupling 666 to transfer energy from the flywheel 402 to the vehicle driveline 400.

As a non-limiting example, the flywheel 602 may capture or supply between about 3% and about 10% of the power requirements of the vehicle the vehicle driveline 600 including the fluid coupling assembly 656, the pumping assembly 658, and the flywheel 602 are incorporated in.

Figure 7:
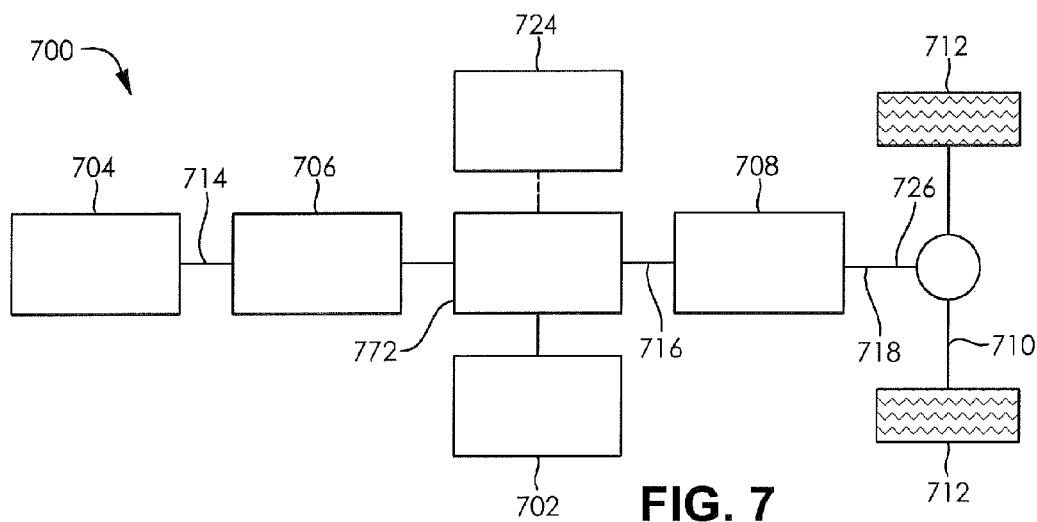
FIG. 7 is a schematic sketch of a vehicle driveline equipped with a flywheel system according to another embodiment of the invention.

FIG. 7 illustrates a vehicle driveline 700 according to another embodiment of the invention. The embodiment shown in FIG. 7 includes similar components to the vehicle driveline 100 illustrated in FIG. 1. Similar features of the embodiment shown in FIG. 7 are numbered similarly in series, with the exception of the features described below. The vehicle driveline 700 includes a power source 704, a flywheel transmission 772, and a flywheel 702.

A power source output 714 of the power source 704 is drivingly engaged with a clutch 706. The clutch 706 is drivingly engaged with the flywheel transmission 772. The flywheel transmission 772 is drivingly engaged with the flywheel 702 and a transmission 708 of the vehicle the vehicle driveline 700 is incorporated in. The flywheel transmission 772 is in communication with a controller 724.

The flywheel transmission 772 is a fixed step transmission. Fixed step transmissions are commonly known in the art. The flywheel transmission 772 includes a plurality of gear ratios capable of providing a total spread ratio capable of engaging a transmission input 716 with the flywheel 702 through the flywheel transmission 772. It is understood that the flywheel transmission 772 may include a clutching device. As a number of gear ratios included with the flywheel transmission 772 increases, losses that occur by joining the transmission input 716 with the flywheel decrease. The flywheel transmission 772 may be combined with the transmission 708 to reduce a cost of the vehicle driveline 700; the flywheel transmission 772 and the transmission 708 may share a housing, lubrication systems, gearing, or other transmission components. Alternately, it is understood that in embodiments of the invention not shown similar to the embodiment shown in FIG. 7 the flywheel transmission 772 or the transmission 708 may be a continuously variable transmission.

The flywheel 702 and the flywheel transmission 772 may be used to start the power source 704. By placing the transmission 708 into a neutral position and partially engaging the clutch 706, energy stored in the flywheel 702 is transferred to the power source 704. When the power source 704 is an internal combustion engine, energy transferred thereto when the power source 704 is not operating may be used to start the power source 704. It is also understood that the clutch 706 may be utilized as a heat sink to dissipate heat generated when the clutch 706 is partially engaged.

It is also understood that in embodiments of the invention not shown similar to the embodiment shown in FIG. 7 having a flywheel and a flywheel transmission connecting to a vehicle driveline between a power source and a primary clutch that the flywheel may also drivingly engage the vehicle driveline between the primary clutch and the vehicle transmission to permit energy stored in the flywheel to be used to start the power source.

As a non-limiting example, the flywheel 702 may capture or supply between about 3% and about 10% of the power requirements of the vehicle the vehicle driveline 700 including the flywheel transmission 772 and the flywheel 702 are incorporated in.

Figure 8:
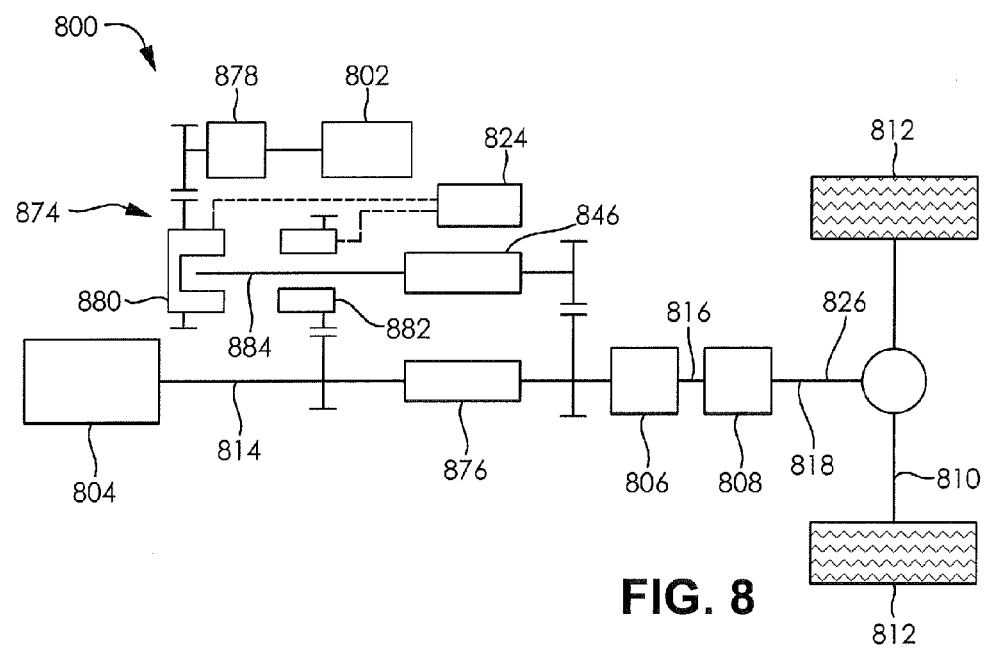
FIG. 8 is a schematic sketch of a vehicle driveline equipped with a flywheel system according to another embodiment of the invention.

FIG. 8 illustrates a vehicle driveline 800 according to another embodiment of the invention. The embodiment shown in FIG. 8 includes similar components to the vehicle driveline 100 illustrated in FIG. 1. Similar features of the embodiment shown in FIG. 8 are numbered similarly in series, with the exception of the features described below. The vehicle driveline 800 includes a switching clutch assembly 874, a torsional damper 846, and gearing bypass 876.

The flywheel 802 as shown in FIG. 8 is geared to permit driving engagement with the switching clutch assembly 874 with a gearing assembly 878. The gearing assembly 878 comprises a series of gears and shafts that reduce a rotational speed of the flywheel 802 to a rotational speed that permits the switching clutch assembly 874 to drivingly engage therewith.

The switching clutch assembly 874 includes a first switching clutch 880, a second switching clutch 882. The first switching clutch 880 and the second switching clutch 882 are fast acting clutches and are each in communication with the controller 824. During operation of the vehicle driveline 800, either the first switching clutch 880 or the second switching clutch 882 is engaged.

The first switching clutch 880 may comprise a plurality of friction plates that engage a geared portion of the first switching clutch 880 with a switching clutch assembly output 884. The geared portion of the first switching clutch 880 is drivingly engaged with an output of the gearing assembly 878.

The second switching clutch 882 may comprise a plurality of friction plates that engage a geared portion of the second switching clutch 882 with the switching clutch assembly output 884. The geared portion of the second switching clutch 882 is drivingly engaged with the power source output 814, and may be geared to permit driving engagement therewith.

The torsional damper 846 connects the switching clutch assembly output 884 and the transmission input 816. The torsional damper 846 may be geared to permit driving engagement with the transmission input 816. The torsional damper 846 may comprise a pair of coaxial member having a plurality of biasing member interposed therebetween; however, it is understood that the torsional damper 846 may be any other type of torsional damper. Compression of the biasing member permits angular deviation between the coaxial members. The torsional damper 846 may be conventional torsional damper that is well known in the art; however, it is understood that the torsional damper 846 may be configured to store a greater amount of energy than a conventional torsional damper and may accommodate large angular deviations between the coaxial members.

The gearing bypass 876 as shown in FIG. 8 is a mechanical connection linking the power source output 814 to the transmission 808 of the vehicle driveline 800. The gearing bypass 876 may be selectively engaged using a clutch (not shown). The gearing bypass 876 may also reduce a rotational speed of the power source 804 to a rotational speed that permits the transmission 808 to drivingly engage therewith. Further, it is understood that in place of the gearing bypass 876, the vehicle driveline 800 may include a ground (not shown) which the transmission 808 may be partially engaged with, to brake at least a portion of the vehicle driveline 800.

When energy is supplied to the vehicle driveline 800 from the flywheel 802, such as when operation of the vehicle requires a greater amount of power than the power source 804 is capable of supplying, the controller 824 directs the first switching clutch 880 to engage, which results in a transfer of energy from the flywheel 802 to the torsional damper 846. The controller 824 also monitors an amount of energy stored in the torsional damper 846. When an appropriate amount of energy is stored in the torsional damper 846, the controller 824 engages the second switching clutch 882 and disengages the first switching clutch 880. Upon engagement of the second witching clutch 882, the energy stored in the torsional damper is transferred to the transmission input 816, thus assisting the power source 804. In embodiments of the invention including the ground instead of the gearing bypass 876, the second switching clutch 882 may be engaged with the ground, and the energy stored in the torsional damper is transferred to the transmission input 816. Upon sensing a torque in the vehicle driveline 800 dropping below a predetermined level, the controller 824 engages the first switching clutch 880 and disengages the second switching clutch 882 to transfer more energy from the flywheel 802 to the torsional damper 846.

The vehicle driveline 800 reduces energy transformation losses and thus increases an efficiency of the vehicle driveline 800 by using the first switching clutch 880 and the second switching clutch 882 and by using the torsional damper 846 having a decreased mass. The torque delivered by the vehicle driveline 800 varies within threshold parameters set by the controller 824 at the switching frequency of the first switching clutch 880 and the second switching clutch 882. If a frequency of switching is low, a second torsional damper (not shown) could be inserted to militate against vibrations traveling from the transmission 808 into remaining portions of the vehicle driveline 800. Further, it is understood that the second torsional damper could be a dual mass flywheel or a portion of the vehicle driveline 800 having an increased mass.

While FIG. 8 depicts one embodiment for implementing the method and apparatus discussed above, the present invention is not limited to these embodiments. Instead, there may be many variations in architecture as well as choices in controls that will result in similar improvements in efficiency of the vehicle driveline. Further, while the use of torsional damper 846 to temporarily store energy at a given speed and release that stored energy at another speed with limited energy loss is depicted in one embodiment in FIG. 8, the same use of the torsional damper 846 can be utilized in any of the other embodiments depicted and described herein in essentially the same manner.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A vehicle driveline, comprising:
a power source;
a clutch drivingly engaged with the power source;
a transmission drivingly engaged with the clutch;
a power transmission device drivingly engaged with one of the power source, the clutch, and the transmission;
a controller in communication with the power transmission device; and
a flywheel drivingly engaged with the power transmission device, wherein the power transmission device facilitates a transfer of energy from the flywheel to one of the clutch and the transmission and the power transmission device facilitates a transfer of energy from one of the power source, the clutch, and the transmission to the flywheel, the controller directing the transfer of energy to and from the flywheel based on at least one of a state of charge of the flywheel, a power requirement of the vehicle driveline, and a state of operation of the power source.

2. The vehicle driveline according to claim 1, wherein the power transmission device is one of a continuously variable transmission, a series electric transmission, a fixed step transmission, a planetary distribution gearset, a fluid coupling assembly, and a switching clutch assembly.

3. The vehicle driveline according to claim 1, wherein the power transmission device is a series electric transmission comprising a first electrical device in electrical communication with a second electrical device.

4. The vehicle driveline according to claim 3, wherein the first electrical device comprises a first electric generator and a first inverter and the second electrical device comprises a second electric generator and a second inverter.

5. The vehicle driveline according to claim 1, further comprising a flywheel clutch drivingly engaged with the power transmission device and one of the power source, the clutch, and the transmission.

6. The vehicle driveline according to claim 5, wherein the power transmission device is a fixed step transmission.

7. The vehicle driveline according to claim 1, wherein the power transmission device is a planetary distribution gearset comprising a carrier assembly drivingly engaged with the power source, a ring gear drivingly engaged with the clutch, and a sun gear drivingly engaged with the flywheel.

8. The vehicle driveline according to claim 7, further comprising a torsional damper drivingly engaged with the sun gear and the flywheel.

9. The vehicle driveline according to claim 1, wherein the power transmission device is a fluid coupling assembly comprising a first fluid coupling and a second fluid coupling.

10. The vehicle driveline according to claim 9, wherein a geared portion of the first fluid coupling is in driving engagement with the power source and the clutch and a geared portion of the second fluid coupling is in driving engagement with the power source and a remaining portion of each of the fluid couplings are in driving engagement with the flywheel.

11. The vehicle driveline according to claim 9, further comprising a pumping assembly including a first fluid pump in fluid communication with the first fluid coupling and a second fluid pump in fluid communication with the second fluid coupling.

12. The vehicle driveline according to claim 1, wherein the power transmission device is a switching clutch assembly comprising a first switching clutch and a second switching clutch.

13. The vehicle driveline according to claim 12, wherein the first switching clutch may be engaged by the controller to drivingly engage the flywheel with a switching clutch assembly output and the second switching clutch may be engaged by the controller to drivingly engage the power source with the switching clutch assembly output.

14. The vehicle driveline according to claim 13, further comprising a torsional damper in driving engagement with the switching clutch assembly output and the transmission.

15. The vehicle driveline according to claim 12, further comprising a gearing bypass which may be selectively engaged to drivingly engage the power source with the transmission.

16. The vehicle driveline according to claim 12, further comprising a gearing assembly in driving engagement with the flywheel and the first switching clutch.

17. A vehicle driveline, comprising:
a power source;
a clutch drivingly engaged with the power source;
a transmission drivingly engaged with the clutch;
a switching clutch assembly drivingly engaged with the power source including a first switching clutch, a second switching clutch, and a switching clutch assembly output;
a flywheel drivingly engaged with the first switching clutch; and
a controller in communication with the first switching clutch and the second switching clutch, the first switching clutch may be engaged to drivingly engage the flywheel with the switching clutch assembly output and the second switching clutch may be engaged to drivingly engage the power source with the switching clutch assembly output, wherein the switching clutch assembly facilitates a transfer of energy from the flywheel to one of the clutch and the transmission and the switching clutch assembly facilitates a transfer of energy from one of the power source, the clutch, and the transmission to the flywheel, the controller directing the transfer of energy to and from the flywheel based on at least one of a state of charge of the flywheel, a power requirement of the vehicle driveline, and a state of operation of the power source.

18. The vehicle driveline according to claim 17, further comprising a torsional damper in driving engagement with the switching clutch assembly output and the transmission.

19. The vehicle driveline according to claim 17, further comprising a gearing bypass which may be selectively engaged to drivingly engage the power source with the transmission.

20. A method of transferring energy from a flywheel, comprising the steps of:
providing a power source;
providing a clutch drivingly engaged with the power source;
providing a transmission drivingly engaged with the clutch;
providing a power transmission device drivingly engaged with one of the power source, the clutch, and the transmission, the power transmission device facilitating a transfer of energy from the flywheel to one of the clutch and the transmission;
providing a controller in communication with the power transmission device;
providing the flywheel drivingly engaged with the power transmission device;
sensing one of a state of charge of the flywheel, a power requirement of the vehicle driveline, and a state of operation of the power source; and
directing a transfer of energy to and from the flywheel based on at least one of the state of charge of the flywheel, the power requirement of the vehicle driveline, and the state of operation of the power source using the controller.

* * * * *